(12) United States Patent
Hulten et al.

(10) Patent No.: US 7,032,724 B1
(45) Date of Patent: Apr. 25, 2006

(54) BRAKE DISC FOR A VEHICLE DISC BRAKE

(75) Inventors: Johan Hulten, Gothenburg (SE); Ingemar Dagh, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/111,189

(22) PCT Filed: Oct. 19, 2000

(86) PCT No.: PCT/SE00/02026

§ 371 (c)(1),
(2), (4) Date: Aug. 26, 2002

(87) PCT Pub. No.: WO01/29442

PCT Pub. Date: Apr. 26, 2001

(30) Foreign Application Priority Data

Oct. 20, 1999 (SE) .................................. 9903789

(51) Int. Cl.
*F16D 65/10* (2006.01)

(52) U.S. Cl. ........................ 188/218 XL; 188/264 A; 188/18 A

(58) Field of Classification Search ........... 188/264 R, 188/218 XL, 18 A, 264 A, 264 AA, 71.6; 192/113.2, 113.21, 113.23
See application file for complete search history.

(56) References Cited

U.S. PATENT DOCUMENTS

| 5,107,966 | A | * | 4/1992 | Metzler et al. | ....... 188/218 XL |
| 5,568,846 | A | * | 10/1996 | Dagh et al. | ........... 188/218 XL |
| 6,032,769 | A | * | 3/2000 | Daudi | .................. 188/218 XL |
| 6,152,270 | A | * | 11/2000 | Giorgetti | .............. 188/218 XL |
| 6,164,423 | A | * | 12/2000 | Dickerson | ............. 188/218 XL |

FOREIGN PATENT DOCUMENTS

| DE | 4210448 A1 | * | 10/1993 | ........... 188/218 XL |
| FR | 2 662 771 | | 12/1991 | |
| FR | 2 749 629 | | 12/1997 | |
| JP | 57-51033 A | * | 3/1982 | ........... 188/218 XL |
| JP | 58-149428 A | * | 9/1983 | ........... 188/218 XL |

* cited by examiner

*Primary Examiner*—James McClellan
*Assistant Examiner*—Mariano Sy
(74) *Attorney, Agent, or Firm*—Young & Thompson

(57) ABSTRACT

Brake disc for a vehicle disc brake, comprising a radially inner hub portion (1a) intended to be non-rotatably joined to a wheel hub and a surrounding, radially outer disc portion with oppositely facing friction surfaces. The outer disc portion is formed of two disc elements (4) joined to the hub portion, which are separated by spacers (7a–7d), which define passages for cooling air.

6 Claims, 2 Drawing Sheets

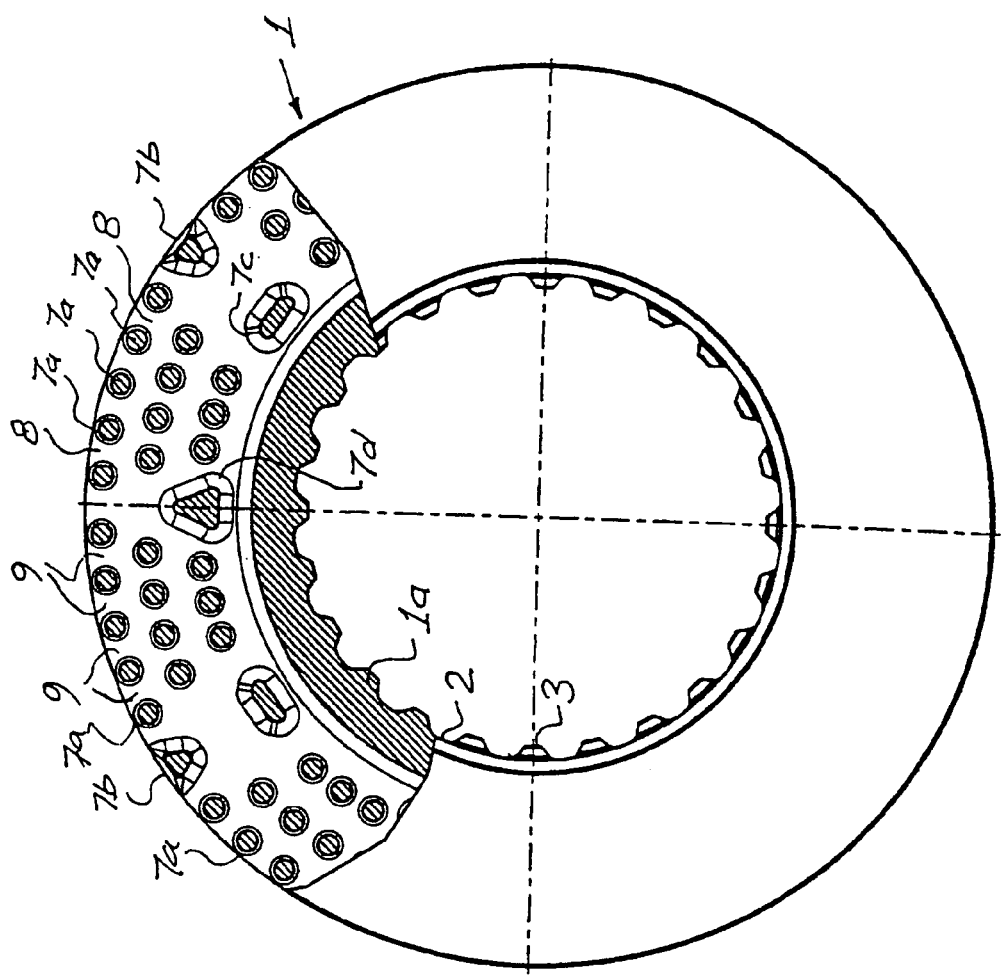
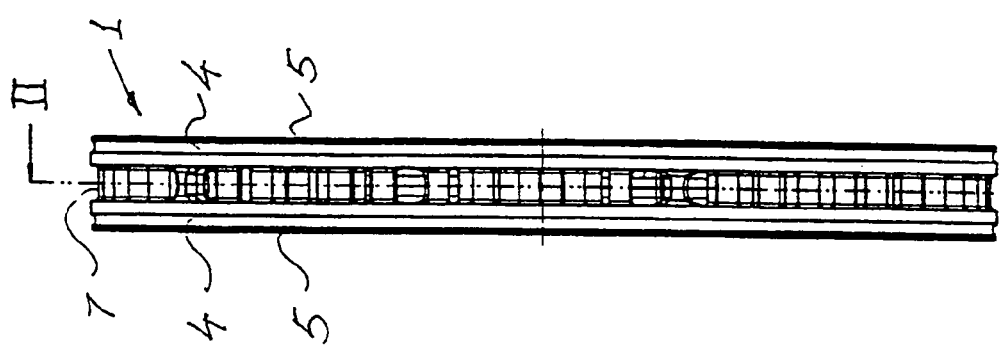

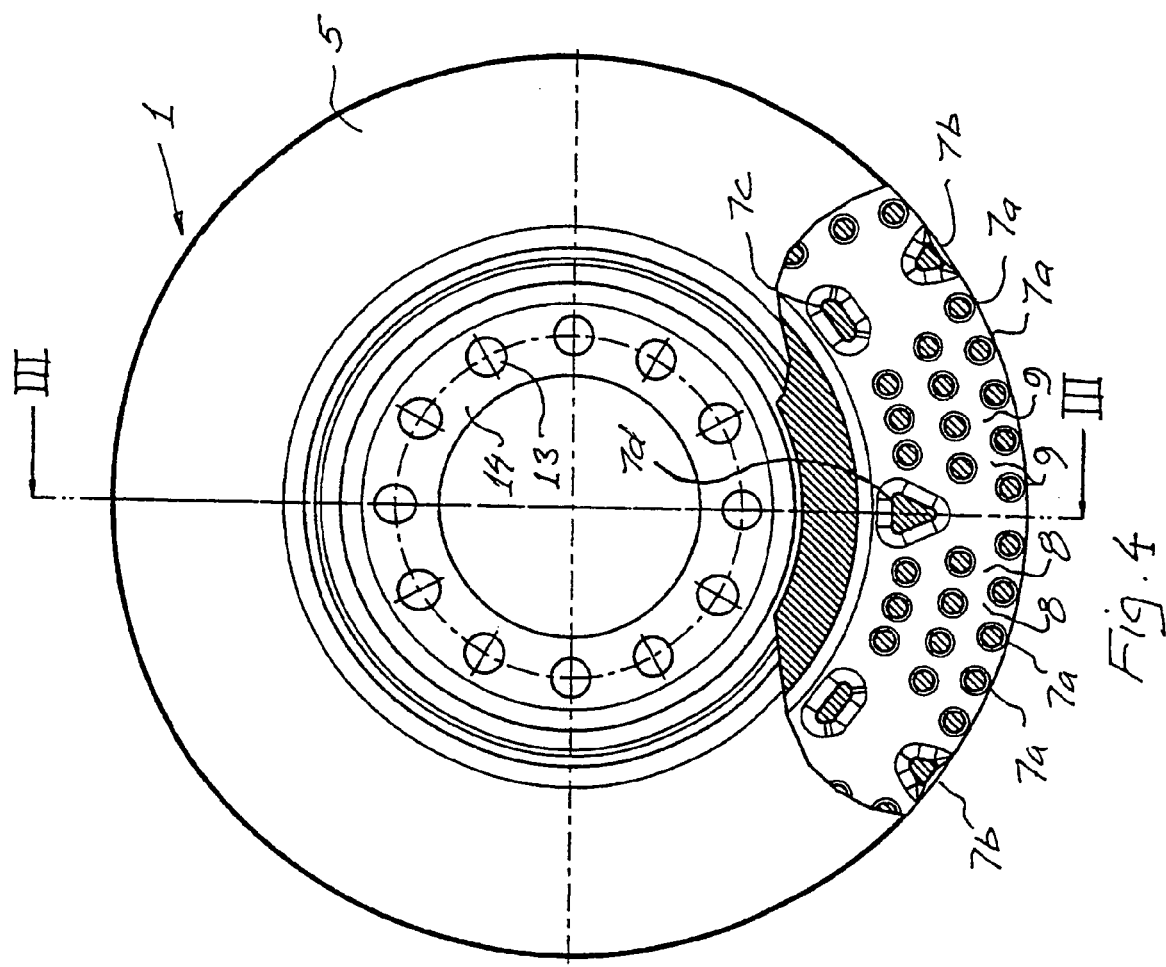
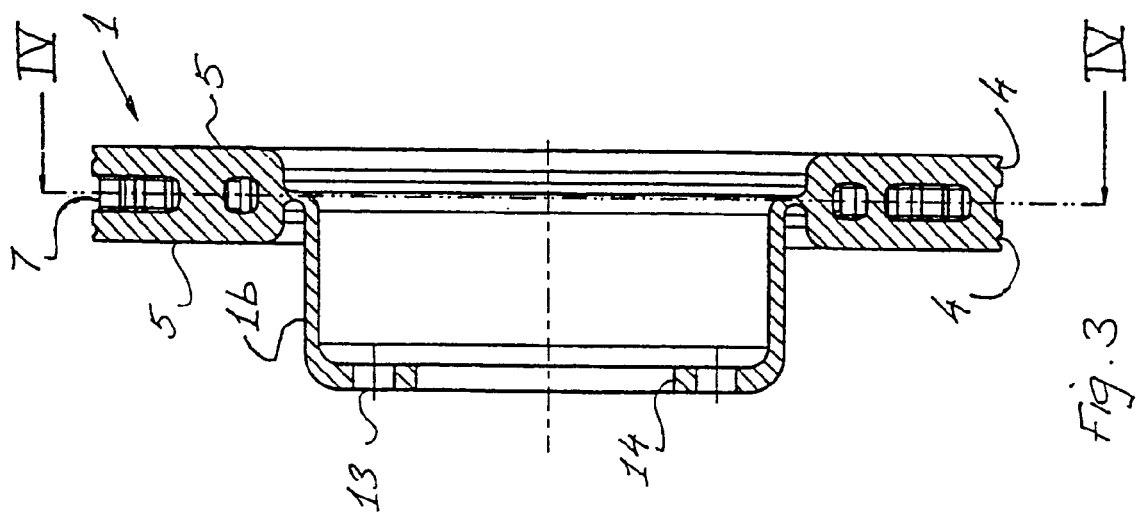

BRAKE DISC FOR A VEHICLE DISC BRAKE

BACKGROUND OF THE INVENTION

The present invention relates to a brake disc for a vehicle disc brake, comprising a radially inner hub portion intended to be non-rotatably joined to a wheel hub, a surrounding, radially outer disc portion with friction surfaces facing in opposite directions, and passages disposed in the outer disc portion, said passages being arranged to guide cooling air in the disc material between the friction surfaces.

DESCRIPTION OF THE RELATED ART

So-called ventilated brake discs, which are made to increase the cooling effect of the ambient air by diverting heat generated during braking, occur in two principle types. One type has channels which extend radially through the disc from the inner periphery of the hub to the outer periphery of the surrounding disc portion. The channels thus have inlet openings in the inner periphery and outlet openings in the outer periphery. As the disc rotates, a guided airflow is created through the channels from the inlet to the outlet. The other type of ventilated brake disc consists of two disc elements, which are fixed to a hub and to each other side-by-side with an intermediate space created by a plurality of spacers in the form of pillars.

By ventilating the disc, the mean temperature of the disc is reduced. Since the wear on the disc and pads is strongly dependent on temperature, a reduction in temperature will have a positive effect on this wear. Furthermore, the highest temperature of the disc is reduced for most driving styles, which in turn reduces the risk of brake fade and the risk of cracking. One disadvantage of having channels opening into the inner periphery of the hub is, however, that the material mass is reduced in that portion of the brake disc where the stresses are greatest, both as regards braking force and temperature difference. The high stresses in connection with the holes in the hub increase the risk of cracking.

SUMMARY OF THE INVENTION

The purpose of the present invention is to achieve a brake disc of the type described by way of introduction, which is constructed so that satisfactory cooling can be achieved without sacrificing strength in the disc hub.

This is achieved according to the invention by virtue of the fact that the passages have inlets and outlets for cooling air at or in the vicinity of the periphery of the radially outer disc portion and that said passages do not penetrate into the hub portion.

The invention is based, in one embodiment, on the above described pillar design for a brake disc, but instead of arranging pillars in the hub portion as well, so that air can circulate through the entire disc from its inner periphery to its outer periphery, the disc is made with a hub portion which is not penetrated into by the air passages. In combination with certain designs of the vehicle wheel house, it has been shown that satisfactory cooling can be achieved without cooling air channels through the hub.

BRIEF DESCRIPTION OF THE DRAWINGS

The invention will be described in more detail below with reference to examples shown in the accompanying drawings, where FIG. 1 shows an end view of a first embodiment of a brake disc according to the invention, FIG. 2 shows a cross-section along the line II—II in FIG. 1, FIG. 3 shows a longitudinal section along the line III—III in FIG. 4 through a second embodiment of a brake disc according to the invention, and FIG. 4 shows a cross-section along the line IV—IV in FIG. 3.

DESCRIPTION OF THE PREFERRED EMBODIMENTS

The brake disc 1 shown in FIGS. 1 and 2 has a radially inner hub portion 1a, the inner lateral surface of which is provided with splines 2, 3 intended to engage corresponding splines in a wheel hub (not shown). Examples of such non-rotatable fixation of the brake disc 1, as an alternative to a more conventional fixation whereby a holed fixing flange on the brake disc is screwed securely to a flange on the wheel hub, are shown and described in SE-A-502 189. The hub portion 1a is cast in one piece with a pair of disc elements 4 arranged with an intermediate spacing. The disc element surfaces 5 facing away from each other form the friction surfaces of the brake disc, against which brake pads (not shown) are pressed during braking. In the intermediate space 7 between the disc elements 4, there are spacer elements 7a, 7b, 7c and 7d. The spacer elements 7a–7d define passages 8 and 9 between them, through which air flows when the brake disc rotates.

The embodiment shown in FIGS. 3 and 4 of the brake disc 1 differs from that described above only in that it has a more conventional hub portion 1b, which has a flange 14 provided with holes 13 for securely screwing to a flange on a wheel hub.

The invention achieves cooling of the brake disc without channels penetrating into the hub portion. This reduces the stresses as compared with known designs with radial channels through the hub portion.

The invention claimed is:

1. Brake disc for a vehicle disc brake, comprising a radially inner hub portion (1a) intended to be non-rotatably joined to a wheel hub, a surrounding, radially outer disc portion (4) with oppositely facing friction surfaces (5), and passages (8, 9) disposed in the outer disc portion, said passages being arranged to guide cooling air in a disc material between the friction surfaces, characterized in that all the passages (8, 9) have inlets and outlets for cooling air at a radially outermost periphery of the outer disc portion, and that said passages do not penetrate into the hub portion, and in that the outer disc portion is formed by two disc elements (4) joined to the hub portion, said disc elements being separated by a plurality of individual, circumferentially spaced apart spacer elements (7a–7d), which define said passages (8, 9) extending between adjacent spacer elements, wherein the spacer elements are in the form of plural concentric rows of pillars, and the passage inlets are remote from a radially inner periphery of the outer disc portion.

2. Brake disc according to claim 1, characterized in that the hub portion (1a) has an inner periphery, which is provided with splines (2) intended to engage corresponding splines on the wheel hub.

3. Brake disc according to claim 1, characterized in that the hub portion (1b) is made with a flange (14) provided with borings (13) for screwing it securely to a fixing flange on a wheel hub.

4. Brake disc for a vehicle disc brake, comprising a radially inner hub portion (1a) intended to be non-rotatably joined to a wheel hub, a surrounding, radially outer disc portion (4) with oppositely facing friction surfaces (5), and passages (8, 9) disposed in the outer disc portion, said passages being arranged to guide cooling air in a disc material between the friction surfaces, characterized in that all the passages (8, 9) have inlets and outlets for cooling air only at a radially outermost periphery of the outer disc portion, and that said passages do not penetrate into the hub portion, and in that the outer disc portion is formed by two disc elements (4) joined to the hub portion, said disc elements being separated by a plurality of individual, circumferentially spaced apart spacer elements (7a–7d), which define said passages (8, 9) extending between adjacent spacer elements, wherein the spacer elements are in the form of plural concentric rows of pillars, and the passage inlets are remote from a radially inner periphery of the outer disc portion.

5. Brake disc according to claim 4, characterized in that the hub portion (1a) has an inner periphery, which is provided with splines (2) intended to engage corresponding splines on the wheel hub.

6. Brake disc according to claim 4, characterized in that the hub portion (1b) is made with a flange (14) provided with borings (13) for screwing it securely to a fixing flange on a wheel hub.

\* \* \* \* \*